United States Patent
Narayanan et al.

(10) Patent No.: US 9,418,241 B2
(45) Date of Patent: Aug. 16, 2016

(54) UNIFIED PLATFORM FOR BIG DATA PROCESSING

(71) Applicant: Infosys Limited, Bangalore (IN)

(72) Inventors: Sudheesh Chandran Narayanan, Bangalore (IN); Sandeep Bhagat, Bangalore (IN)

(73) Assignee: Infosys Limited, Bangalore (IN)

(*) Notice: Subject to any disclaimer, the term of this patent is extended or adjusted under 35 U.S.C. 154(b) by 0 days.

(21) Appl. No.: 14/181,109

(22) Filed: Feb. 14, 2014

(65) Prior Publication Data

US 2014/0237554 A1  Aug. 21, 2014

(30) Foreign Application Priority Data

Feb. 15, 2013 (IN) .............................. 691/CHE/2013

(51) Int. Cl.
H04L 29/06 (2006.01)
G06F 21/62 (2013.01)

(52) U.S. Cl.
CPC ........ *G06F 21/6227* (2013.01); *H04L 63/0227* (2013.01); *H04L 63/0263* (2013.01)

(58) Field of Classification Search
CPC .......... G06F 17/30315; G06F 17/3056; G06F 17/30; G06F 15/16; G06F 21/00; G06F 21/6227; G06F 21/335; G06F 21/6218; G06F 9/54; G06F 8/427; G06F 7/00; G06F 17/50; G06F 12/00; G06F 17/5009; G06F 17/30569; G06F 17/5004; H04L 63/0227; G06Q 10/0637

USPC ......... 726/4, 10; 380/270; 707/661, 737, 756, 707/E17.005, 810, 821, 940; 709/223, 228; 719/311, 313, 318

See application file for complete search history.

(56) References Cited

U.S. PATENT DOCUMENTS

| | | | |
|---|---|---|---|
| 6,684,310 B2* | 1/2004 | Anzai .................... | G06F 21/80 710/36 |
| 7,343,604 B2* | 3/2008 | Grabarnik .............. | G06F 8/427 709/223 |
| 8,341,715 B2* | 12/2012 | Sherkin et al. .................. | 726/10 |
| 2009/0307651 A1 | 12/2009 | Senthil et al. | |
| 2010/0114895 A1 | 5/2010 | Bhagwan et al. | |
| 2011/0161946 A1 | 6/2011 | Thomson et al. | |
| 2013/0006992 A1* | 1/2013 | Dani et al. .................... | 707/737 |
| 2013/0124483 A1* | 5/2013 | Furuhashi et al. ............ | 707/661 |

* cited by examiner

*Primary Examiner* — Thanhnga B Truong
(74) *Attorney, Agent, or Firm* — LeClairRyan, a Professional Corporation

(57) ABSTRACT

This technology relate to methods and systems for big data processing. The system includes extraction modules for extracting data from the data sources. The system also includes means for defining rules to be applied on the data and means for applying the rules on the data in conjunction with the extraction modules. The means for applying the rules is capable of applying pre-defined set of rules and the rules defined by means of defining the rules. The system also has controllers for defining access control restrictions on the data in conjunction with the extraction modules, display for displaying visual representations of the data processing in conjunction with the extraction modules and memory to store the extracted data in indexed form.

21 Claims, 2 Drawing Sheets

UNIFIED PLATFORM FOR BIG DATA PROCESSING

This application claims the benefit of Indian Patent Application Filing No. 691/CHE/2013, filed Feb. 15, 2013, which is hereby incorporated by reference in its entirety.

FIELD

The technology generally relates to methods and systems for data processing and, more particularly, to methods and systems for big data processing.

BACKGROUND

In present scenario, the applicability of data processing technologies can be observed very commonly in a number of applications. Typically, in data processing a sender saves a certain data into a file in a certain format, and then sends the file to a recipient. Upon receiving the file, the recipient analyzes content within the file, and performs logical processing accordingly. In the recited data processing procedure, if the file is not too big, and the recipient does not have a strict processing time requirement, a single server or a single thread can used for processing. Under the given circumstance, corresponding system may still operate normally, though the time taken by the recipient to process the data of these files may be quite long.

However, some other scenarios of data processing could be a sender wishes to send a huge file or if the number of files needs to be sent is large. In addition to this, if the recipient has a very strict processing time requirement e.g., the recipient may require the data of the file transmitted from the sender to be processed in a shorter period. Under these conditions, the processing system using single server or single thread may not be able to satisfy the data processing needs.

In the above-mentioned conditions, the data to be processed may exceed the capacity of conventional processing systems and/or the processing speed required is too high that it cannot be fulfilled by the conventional data processing methods and systems. The data that need to be processed in these scenarios is conventionally termed as big data.

At present, the commonly used frameworks for big data processing are MapReduce® and its open source implementation from Hadoop®. In these frameworks, a computing task can be executing on a large set of nodes, as long as it is been expressed as a sequence of Maps (independent computations on subsets of the input data) and Reduce (merge of Map results).

Currently big data processing advantages distributed computing clusters using Hadoop Ecosystem® components or niche distributed grid-computing components. All of these components expect developers to code MapReduce® programs to develop the data transformation using Hadoop® or similar programming models for other systems. Some of the existing database product companies provide support for connecting to database from the Hadoop Ecosystem® using some form of native connectors. Again, these connectors have to program by developers to leverage the connectivity and capability. In addition, some of the existing data integration products like Pentaho® provide support for Hadoop® data integration with existing enterprise data. In addition to it, Hadoop® Howeveris only applicable for batch processing but it does not addresses the real time processing needs.

None of the existing big data processing platforms provides a unified model for real-time and batch processing of data. In addition, none of the existing techniques includes pre-build adapters for pre-build adapters for performing routine processing, data transformations, machine learning, and analytics on the Hadoop® platform. Additionally, there is a strong need of big data processing systems that can provide one-click big data cluster setup right from the infrastructure provisioning. Another important need of big data processing systems is to provide certain big data services like recommendation engine. It is also required that the business insight derived from a big data processing system should be secured and only available to the authorized users.

SUMMARY

Disclosed are method and system for solving the above-mentioned problems by simplifying the big data application development using a GUI workflow based big data processing pipeline design.

This technology provides a method for processing big data. The first step of the method is extracting data from at least one data source followed by applying a pre-defined set of rules on the data at run-time. The run-time is data extraction time. The next step of the method comprises defining one or more rules to be applied on the data at run-time, wherein the one or more rules comprises a first set of rules for batch processing of the data and a second set of rules for real-time processing of the data. As the next step of the method, the first set of rules on the data at run-time in case of batch processing and/or the second set of rules on the data at run-time in case of real-time processing are applied on the data. The method also includes a step of defining one or more access control restrictions on the data at run-time and then displaying one or more visual representations of the data processing at one or more time instances during run-time. As the last step of the method, the system stores the extracted data in indexed form at run-time completion.

This technology also provides a system for processing big data. The system includes extraction modules for extracting data from the data sources. The system also includes means for defining rules to be applied on the data and means for applying the rules on the data in conjunction with the extraction modules. The means for applying the rules is capable of applying pre-defined set of rules and the rules defined by means of defining the rules. The system also has controllers for defining access control restrictions on the data in conjunction with the extraction modules, display for displaying visual representations of the data processing in conjunction with the extraction modules and memory to store the extracted data in indexed form.

In an embodiment, this technology discloses transparently executing of the designed big data processing pipeline on a distributed.

In an another embodiment, this technology provides recited prebuild adapters for simplification of the machine learning algorithms so that machine learning programs can be created on the fly using the unified data processing pipeline.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for data processing are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

This technology relates to methods and systems for big data processing.

According to one exemplary embodiment, a big data processing system is described. This embodiment aids in simplifying the big data application development using a simple GUI workflow based big data processing pipeline design. It also aids in transparently executing of the designed big data processing pipeline on a distributed infrastructure and in seamless execution of the batch mode and real-time mode for the big data processing pipeline.

Figure 1:
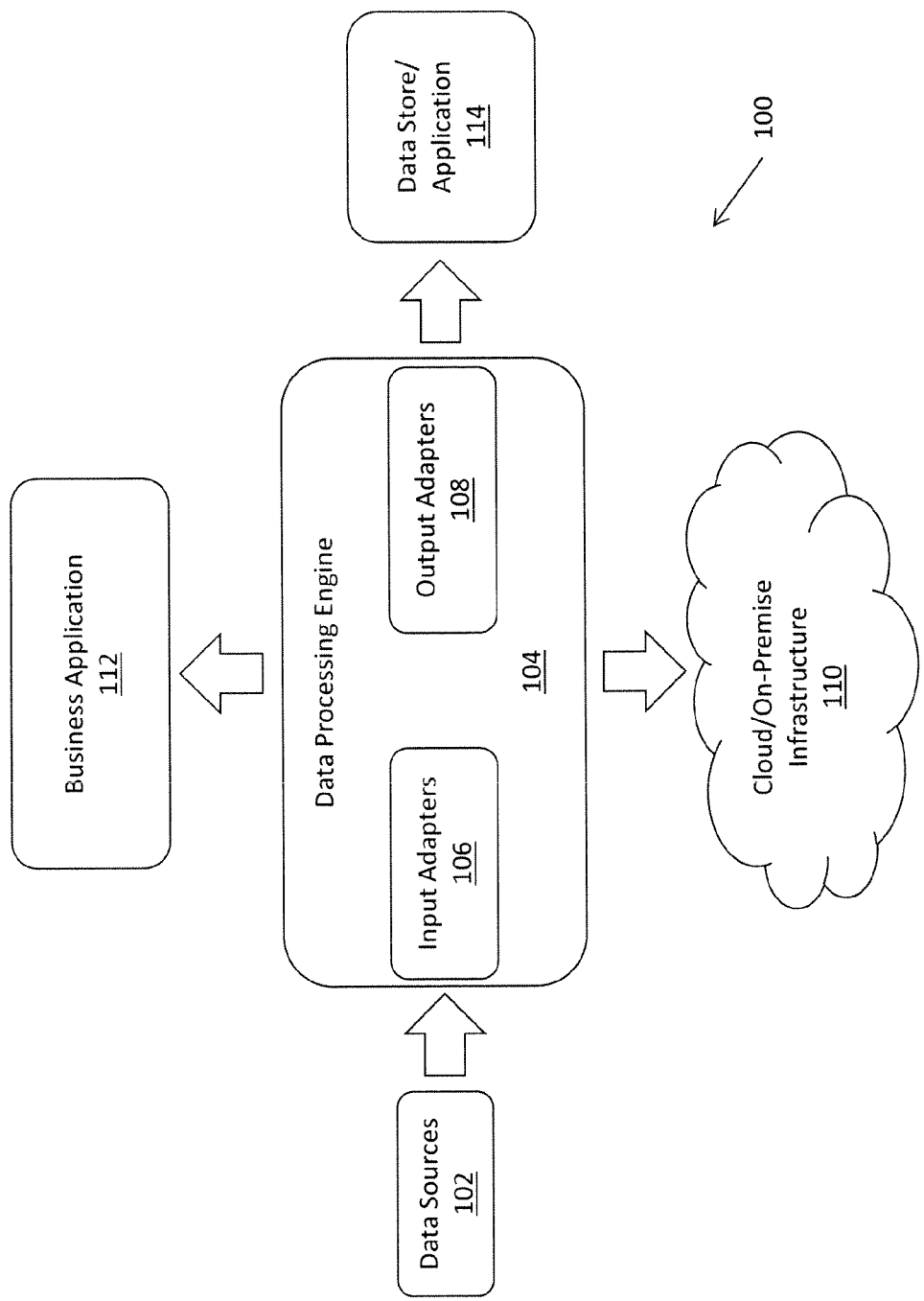
FIG. 1 is an illustrative diagram of a conceptual view of an example of a big data processing system, in accordance with a described embodiment.

FIG. 1 is an illustrative diagram of a conceptual view of the big data processing system 100, in accordance with a described embodiment. The processing system 100 presented in FIG. 1 comprises one or more data sources 102, a data processing engine 104, a cloud and/or on-premises infrastructure 110, business application module 112, and a data storage unit and/or application module 114. The data processing engine 104 includes one or more input adapters 106 and one or more output adapters 108. The data sources 102 include data sources such as structured data sources, unstructured data sources, email servers, enterprises data, log files, etc. The data sources 102 also include both batch and real-time data sources. Real-time data sources are like event feeds or event streams. The processing engine 104 extracts data from data sources 102 through input adapters 106. To extract the data from the data sources 102, all the available data sources have to be defined within the processing engine 104. The available data sources are defined within the processing engine 104 by defining the type of data sources available, locations of available data sources, access rights of the available data sources, data formats of the available data sources and so on. This information is predefined as an information model and/or an information definition within the processing engine 104. In a preferred embodiment, the information model and/or information definition can also be defined within the processing engine 104 on the fly i.e. at the time of extraction. During the information definition process, the processing engine 104 can also define how the information sources is cleansed, parsed, and transformed as it gets pulled into the system. The processing engine 104 can specify how the different types of processing logic can be applied to extraction data as it is pulled into the system.

Another capability of the processing engine 104 is while extraction the information from different sources, it can define what kind of input adapter from group of input adapters 106 should be applied and how the selected input adapter can transform the extracted data for a selected output adapter from a group of output adapters 108. The input adapters 106 and output adapters 108 are operable in plug and play mode. In the sense, we could connect the output of any transformation to the input of any transformation. To facilitate this kind of process, an algorithm plumbing model is defined, which aids in defining how the input adapters 106 and output adapters 108 can work in a plug and play model. In addition to this, the processing engine 104 is capable of defining the data extraction rules for batch processing and real-time processing separately. The engine 104 can apply various batch processing extraction rules and real time processing access rules both simultaneously or separately on the data at the time of extraction for seamless processing of data. The processing engine 104 can also define access rights i.e. control restrictions for the data that will be extracted through the information model. The access rights include reading the data, writing, modifying the data and/or copy the data. The processing engine 104 is in contact with a display unit (not shown in figure). The processing engine 104 is capable of displaying visual presentation of the data at any stage of data extraction. In other words, the display unit associated with big data processing system 100 can display visual representation of the data at any instance of time during extraction of data i.e. run-time. Various time instances may include raw data representation at the time data extraction from data sources 102, visually representing the available bandwidth during run-time, how data representation is changing by applying various predefined or instantly defined rules on the raw data, and so on. The processing engine 104 may store the data in a data store 114, which is connected with the processing engine 104 through one or more output adapters 108. In a preferred embodiment, the data can directly use for an enterprise related application. The processing engine 104 is also capable of deploying the final data to a deployment environment, which may include a public cloud and/or on-premises infrastructure 110. The data processed in the processing engine 104 can also use for various business applications 112. The business applications 112 may include fraud detection, sentiment analysis, risk analysis, customer profiling, recommendation, and so on.

Figure 2:
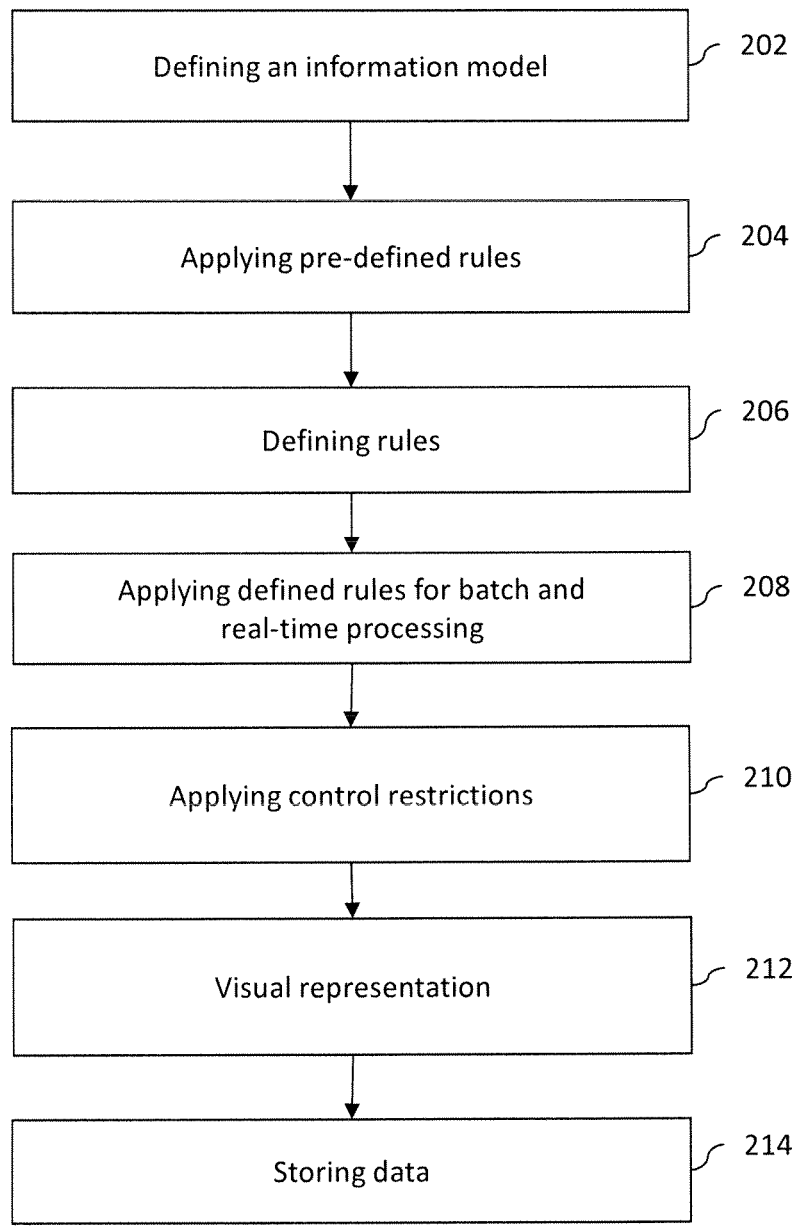
FIG. 2 is a flow chart depicting an example of a method for big data processing, in accordance with a described embodiment of the present invention.

FIG. 2 is an illustrative flowchart on an example of a method for processing big data, in accordance with some embodiments. At first step i.e. 202 of the method for processing big data, an information model is defined for extracting information from various data sources. The data sources include structured data sources, unstructured data sources, email servers, enterprises data, log files, and so on. The data sources may also include both batch and real-time data sources. Real-time data sources are like event feeds or event streams. In a preferred embodiment, the information model may also include defining the type of data sources available, locations of available data sources, access rights of the available data sources, data formats of the available data sources and so on. In another embodiment, the information can be a pre-defined model and it can also be defined at the time of data extraction i.e. run-time. At step 204 of the processing method, a set of predefined rules is applied on raw data and/or data sources at the time of data extraction. The set of predefined rules may include definitions for how the raw data and/or information sources has to be cleansed, parsed, and transformed at the time of extraction i.e. run-time. At step 206 and step 208 for the method of processing big data, data extraction rules can be defined and applied on the data during extraction i.e. run-time. Rules defined at step 206 can be defined only for batch processing, or only for real-time processing or for both types of data processing simultaneously. Similarly, at method step 208, both types of rules i.e. rules for batch processing and rules for real-time processing can be applied simultaneously or separately on the data during extraction. Further, at the next method step 210, control restrictions can be applied on the data at the time of extraction. The control restrictions define access rights for the data that will be extracted through the information model. The access rights can also defined at the time extraction i.e. at run-time. The access rights include reading the data, writing, modifying the data and/or copy the data. The next method step i.e. step 212 defines the visual representation of the data at the time of extraction. The visual representation of the data can be generated at any instant during and/or after data extraction i.e. run time. In other words, the processing of data at any step of the processing method can visually represented with the help of symbolic representation, graphs or by using any visual representation known in the art. The visual representation includes the display of raw data at the time data extraction from data sources, available bandwidth during run-time, data transformation by applying various predefined or instantly defined rules and/or access rights on the raw data, and so on. The final step 214 of the processing method is storing the extracted data at a pre-defined location in indexed form. In other words, at the last method step i.e. i.e. after the completion of run time, the extracted data get stored at a definite location in a pre-defined structure for future use. In a preferred embodiment, the extracted data can directly be used for any business application or enterprise solution or can be deployed to a cloud network or to a premises infrastructure after completion of run time.

Embodiments of the present invention enable big data processing system to process big data in more efficient manner. The present invention also enables a seamless batch processing and real time processing of data simultaneously. The invention also recites the use of pre-build plug and play, input and output adapters that are capable of transforming the data from one form to another desired form of data.

The present description includes the best presently contemplated method for carrying out the present invention. Various modifications to the embodiments will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible non-transitory machine readable media, such as on memory chips, local or remote hard disks, optical disks or other media, which may be accessed by a processor based system to execute the stored code.

Although the environment is described in this example with the data processing apparatus having at least one memory with the data processing engine coupled to at least one processor configured to execute programmed instructions stored in the memory as described and illustrated with the examples herein, other types and numbers of systems, devices, components, and/or elements in other configurations and topologies can be used. It is to be understood that the systems and/or apparatuses of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer device(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for processing big data, the method comprising:

defining, by the data processing apparatus, an information model comprising one or more pre-defined rules for extracting data from at least one data source, and one or more extraction rules to be applied to the data during extraction of the data from the at least one data source, wherein the one or more pre-defined rules define a batch processing data source or a real-time processing data source and a location where the batch processing data source or the real-time processing data source is available and the one or more extraction rules comprise rules for parsing and transforming the data;

extracting, by a data processing apparatus, the data from the location where the batch processing data source or the real-time processing data source is defined as available in the one or more pre-defined rules, wherein the one or more extraction rules are applied to the data during the extraction of the data from the at least one data source; and storing, by the data processing apparatus, the extracted data in indexed form after the extraction of the data has been completed.

2. The method as claimed in claim 1, wherein the extracting data from at the least one data source further comprises:

executing, by the data processing apparatus, one or more predefined queries on the at least one data source.

3. The method as claimed in claim 2, wherein the one or more pre-defined queries are executed in conjunction with one or more types of analysis to be performed on the extracted data.

4. The method as claimed in claim 1, wherein the one or more pre-defined rules comprises data filtering rules, keywords check rules, special condition application rules, or source restriction rules.

5. The method as claimed in claim 1 wherein, the defining the one or more rules comprises analyzing the one or more types of analysis to be performed on the extracted data.

6. The method as claimed in claim 1, wherein the one or more extraction rules further comprise access control restrictions comprising writing restrictions, modifying restrictions, copying restrictions, or reading restrictions.

7. The method as claimed in claim 1, further comprising:

generating one or more visual representations based on the data, the one or more visual representations comprising one or more graphs or one or more bandwidth indicatives.

8. A non-transitory computer readable medium having stored thereon instructions for processing data comprising executable code which when executed by at least one processor, causes the processor to perform steps comprising:

defining an information model comprising one or more pre-defined rules for extracting data from at least one data source, and one or more extraction rules to be applied to the data during the extraction of the data from the at least one data source, wherein the one or more pre-defined rules define a batch processing data source or a real-time processing data source and a location where the batch processing data source or the real-time processing data source is available and the one or more extraction rules comprise rules for parsing and transforming the data;

extracting the data from the location where the batch processing data source or the real-time processing data source is defined as available in the one or more pre-defined rules, wherein the one or more extraction rules are applied to the data during the extracting of the data from the at least one data source; and storing the extracted data in indexed form after the extraction of the data has been completed.

9. The medium as claimed in claim 8, wherein the extracting the data from the at least one data source further comprises executing one or more predefined queries on the at least one data source.

10. The medium as claimed in claim 9, wherein the one or more pre-defined queries are executed in conjunction with one or more types of analysis to be performed on the extracted data.

11. The medium as claimed in claim 8, wherein the pre-defined set of rules further comprises data filtering rules, keywords check rules, special condition application rules, or source restriction rules.

12. The medium as claimed in claim 10, wherein the defining the information model further comprises analyzing the one or more types of analysis to be performed on the extracted data.

13. The medium as claimed in claim 8, wherein the one or more extraction rules further comprise one or more access control restrictions comprising writing restrictions, modifying restrictions, copying restrictions, reading restrictions.

14. The medium as claimed in claim 8, further comprising:

generating one or more visual representations based on the data, the one or more visual representations comprising one or more graphs or one or more bandwidth indicatives.

15. A data processing computing apparatus comprising:

a processor; and a memory coupled to the processor and configured to be capable of executing programmed instructions, which comprise instructions stored in the memory to:

define an information model comprising one or more pre-defined rules for extracting data from at least one data source, and one or more extraction rules to be applied to the data during the extraction of the data from the at least one data source, wherein the one or more pre-defined rules define a batch processing data source or a real-time processing data source and a location where the batch processing data source or the real-time processing data source is available and the one or more extraction rules comprise rules for parsing and transforming the data;

extract the data from the location where the batch processing data source or the real-time processing data source is defined as available in the one or more pre-defined rules, wherein the one or more extraction rules are applied to the data during the extraction of the data from the at least one data source; and store the extracted data in indexed form after the extraction of the data has been completed.

16. The apparatus as claimed in claim 15, wherein the processor is further configured to be capable of executing programmed instructions stored in the memory for the extracting data from at least one data source further comprising:

executing one or more predefined queries on at least one data source.

17. The apparatus as claimed in claim 16, wherein the one or more pre-defined queries are executed in conjunction with one or more types of analysis to be performed on the extracted data.

18. The apparatus as claimed in claim 15, wherein the pre-defined rules comprise data filtering rules, keywords check rules, special condition application rules, or source restriction rules.

19. The apparatus as claimed in claim 15, wherein the defining the information model further comprises analyzing the one or more types of analysis to be performed on the extracted data.

20. The apparatus as claimed in claim 15, wherein the one or more extraction rules further comprise one or more access control restrictions comprising writing restrictions, modifying restrictions, copying restrictions, or reading restrictions.

21. The apparatus as claimed in claim 15, further comprising:

generating one or more visual representations based on the data, the one or more visual representations comprising one or more graphs or one or more bandwidth indicatives.

* * * * *